(12) United States Patent
Kim et al.

(10) Patent No.: US 11,303,871 B2
(45) Date of Patent: Apr. 12, 2022

(54) SERVER AND DISPLAY APPARATUS, AND CONTROL METHODS THEREOF

(71) Applicant: SAMSUNG ELECTRONICS CO., LTD., Suwon-si (KR)

(72) Inventors: Yong-deok Kim, Seongnam-si (KR); Bo-eun Kim, Seoul (KR); Sung-hyun Kim, Yongin-si (KR); Jong-in Lee, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/638,585

(22) PCT Filed: Aug. 2, 2018

(86) PCT No.: PCT/KR2018/008790
§ 371 (c)(1),
(2) Date: Feb. 12, 2020

(87) PCT Pub. No.: WO2019/035581
PCT Pub. Date: Feb. 21, 2019

(65) Prior Publication Data
US 2020/0221061 A1 Jul. 9, 2020

(30) Foreign Application Priority Data
Aug. 16, 2017 (KR) .......................... 10-2017-0103655

(51) Int. Cl.
*H04N 13/117* (2018.01)
*G06F 3/14* (2006.01)
*H04N 13/194* (2018.01)

(52) U.S. Cl.
CPC ......... *H04N 13/117* (2018.05); *G06F 3/1423* (2013.01); *H04N 13/194* (2018.05)

(58) Field of Classification Search
USPC .................................. 386/200–234, 239–248
See application file for complete search history.

(56) References Cited

U.S. PATENT DOCUMENTS

| 5,850,352 A | 12/1998 | Moezzi et al. |
| 8,724,868 B2 | 5/2014 | Wang et al. |

(Continued)

FOREIGN PATENT DOCUMENTS

| JP | 2006-109160 | 4/2006 |
| JP | 2013-030161 | 2/2013 |

(Continued)

OTHER PUBLICATIONS

Extended Search Report dated May 4, 2020 in counterpart European Patent Application No. 18846089.3.

(Continued)

*Primary Examiner* — Hung Q Dang
(74) *Attorney, Agent, or Firm* — Nixon & Vanderhye, P.C.

(57) ABSTRACT

A server according to the disclosure includes a communicator configured to communicate with a plurality of display apparatuses; and a controller configured to produce a plurality of split images corresponding to individual view angles of screens of the plurality of display apparatuses from each frame of a 360-degree image including a plurality of frames, transmit the plurality of split images according to the frames to the corresponding display apparatus, and control the communicator to transmit a split image updated corresponding to change in the individual view angle based on movement of a view point.

11 Claims, 16 Drawing Sheets

(56) References Cited

U.S. PATENT DOCUMENTS

| | | | | |
|---|---|---|---|---|
| 2001/0040671 | A1* | 11/2001 | Metcalf | G03B 37/04 |
| | | | | 353/94 |
| 2006/0112124 | A1 | 5/2006 | Ando et al. | |
| 2012/0321187 | A1 | 12/2012 | Yamaji et al. | |
| 2013/0181901 | A1* | 7/2013 | West | G09G 5/14 |
| | | | | 345/161 |
| 2016/0093271 | A1* | 3/2016 | Cho | H04N 21/242 |
| | | | | 345/1.3 |
| 2016/0292821 | A1 | 10/2016 | Cho et al. | |
| 2016/0337630 | A1 | 11/2016 | Raghoebardajal et al. | |
| 2016/0337706 | A1* | 11/2016 | Hwang | H04N 21/4382 |
| 2019/0139313 | A1* | 5/2019 | De La Riviere | G06T 19/00 |

FOREIGN PATENT DOCUMENTS

| | | |
|---|---|---|
| KR | 10-2016-0017214 | 2/2016 |
| KR | 10-2016-0054249 | 5/2016 |
| KR | 10-2016-0118868 | 10/2016 |
| KR | 10-2017-0008725 | 1/2017 |
| WO | 2016/191467 | 12/2016 |

OTHER PUBLICATIONS

Van Der Auwera G et al: "AHG8: Tsp Evaluation With Viewport-Aware Quality Metric For 360 Video", 5th JVET Meeting; Dec. 1, 2017-Jan. 20, 2017; Geneva; (The Joint Video Exploration Team of ISO/IEC JTC1/SC29/WG11 and ITU-T SG.16); Jan. 4, 2017 (Jan. 4, 2017), XP030150552 (10 pages).

Junichi Hara et al: "JPEG360 use cases and metadata under consideration", 75th JPEG Meeting;Mar. 26, 2017-Mar. 31, 2017; Sydney; (Joint Picture Expert Group or ISO/IEC JTC1/SC29/WG1); Mar. 29, 2017 (Mar. 29, 2017), XP030190419 (5 pages).

International Search Report for PCT/KR2018/008790, dated Nov. 26, 2018, 6 pages.

Written Opinion of the ISA for PCT/KR2018/008790, dated Nov. 26, 2018, 7 pages.

Office Action dated Mar. 11, 2021 in KR 10-2017-0103655 and partial English-language translation.

Communication pursuant to Article 94(3) EPC dated Jul. 29, 2021 in counterpart European Application No. 18846089.3.

Notice of Allowance dated Sep. 30, 2021 in counterpart KR 10-2017-0103655 and English-language translation.

* cited by examiner

FIG. 14
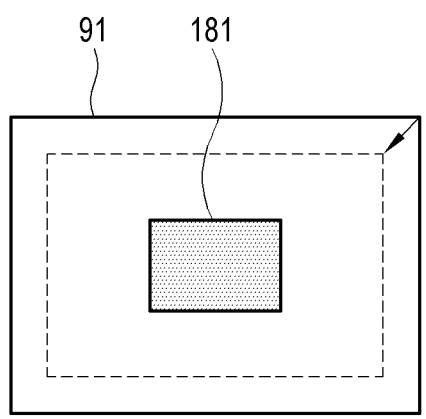
ZOOM IN
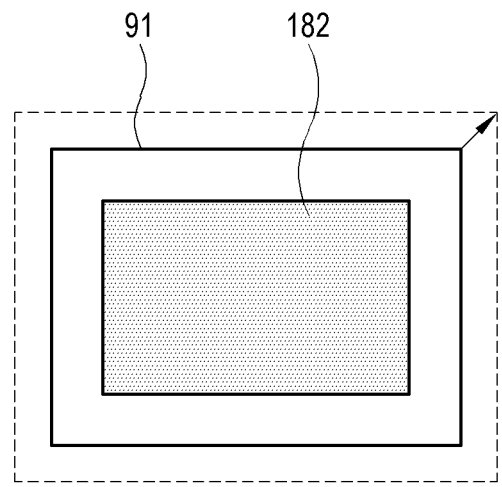
ZOOM OUT

FIG. 15
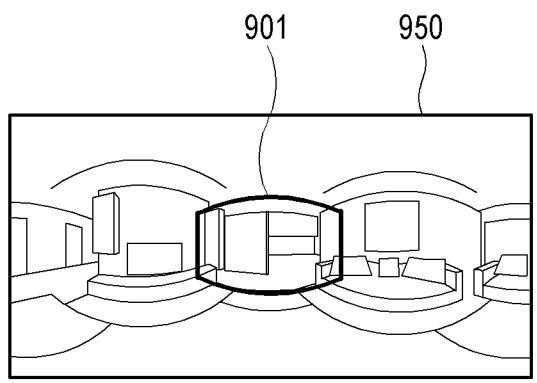
LARGE VIEW ANGLE
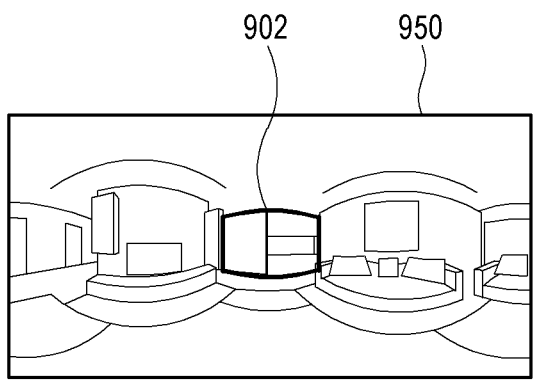
SMALL VIEW ANGLE
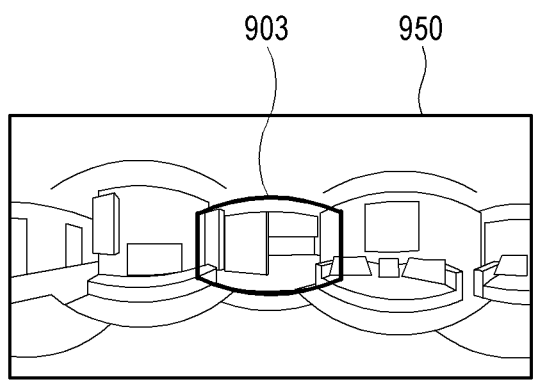
RECTILINEAR
PROJECTION
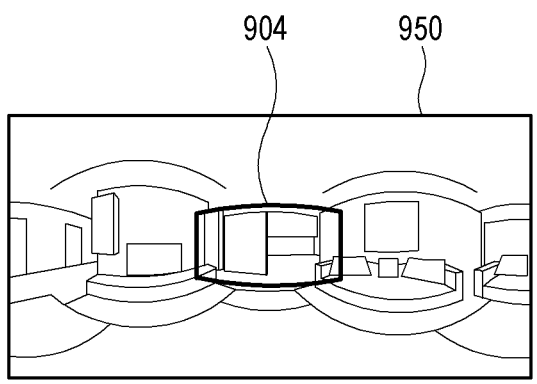
STEREOGRAPHIC
PROJECTION

SERVER AND DISPLAY APPARATUS, AND CONTROL METHODS THEREOF

This application is the U.S. national phase of International Application No. PCT/KR2018/008790 filed 2 Aug. 2018, which designated the U.S. and claims priority to KR Patent Application No. 10-2017-0103655 filed 16 Aug. 2017, the entire contents of each of which are hereby incorporated by reference.

TECHNICAL FIELD

The disclosure relates to a server and a display apparatus, and control methods thereof, and more particularly to a server and a display apparatus, which reproduce a 360-degree image on multi-screens, and control methods thereof.

BACKGROUND ART

With recent increasing interest in virtual reality (VR) and release of various personal photographing devices, production of 360-degree content for broadcast, movies or the like has been geometrically on the rise. Such 360-degree content is displayable through not only a head mounted display (HMD) but also various devices such as a personal computer (PC), a television (TV), a smart phone, etc.

The 360-degree content allows a viewer to experience omnidirectional views. In particular, when a viewer watches the 360-degree content through multi-screens, the viewer can be immersed in watching experience through a wide view angle.

In a conventional HMD, a part of a 360-degree image is received and reproduced according to a current user's viewpoint. However, to reproduce the 360-degree content on the multi-screens, the respective screens need to display content of different viewpoints.

Further, high-quality reproduction of a 360-degree image using the multi-screens is limited in a restricted network state.

SUMMARY

Accordingly, an aspect of the disclosure is to provide a server and a display apparatus, which reproduce a 360-degree image on multi-screens, and control methods thereof.

Another aspect of the disclosure is to provide a server and a display apparatus, which reproduce a 360-degree image on multi-screens corresponding to change in a viewpoint and a view angle based on user control, and control methods thereof.

Still another aspect of the disclosure is to provide a server and a display apparatus, which provide a 360-degree image with high quality through multi-screens even under a restricted network condition, and control methods thereof.

The aspects of the disclosure may be achieved by providing a server including: a communicator configured to communicate with a plurality of display apparatuses; and a controller configured to produce a plurality of split images corresponding to individual view angles of screens of the plurality of display apparatuses from each frame of a 360-degree image including a plurality of frames, transmit the plurality of split images according to the frames to the corresponding display apparatus, and control the communicator to transmit a split image updated corresponding to change in the individual view angle based on movement of a view point.

According to such an embodiment of the disclosure, the 360-degree image can be reproduced on the multi-screens, corresponding to the viewpoints of the screens. Further, the stream of the 360-degree image can be provided corresponding to the viewpoint and the view angle changed based on the user control with regard to the multi-screens.

The controller may receive information about whether a projection image displayed on a corresponding screen is displayed beyond a boundary area of the corresponding split image based on the individual view angle from at least one of the plurality of display apparatuses, and update the split image based on the received information. Thus, the updated image is provided to the corresponding screen when an image is displayed beyond a boundary area of the split image as the viewpoint and the view angle are changed by user control.

The controller may transmit the updated split images to the plurality of display apparatuses, based on order of a projection image displayed on each screen beyond a boundary area of the corresponding split image among the plurality of display apparatuses. Thus, the updated split image may be preferentially provided to the screen of which the viewpoint and the view angle are first changed based on the user control.

The controller may transmit layout information about each frame of the 360-degree image to each of the plurality of display apparatuses, and transmit the split image based on the transmitted layout information. The layout information may include information about locations and sizes of split images corresponding to a plurality of screens in a corresponding frame of a 360-degree image. Thus, when the multi-screens are connected in series to the server, the split images of the 360-degree image may be provided to the screens based on the layout information.

The controller may identify a data amount of a split image transmitted to the display apparatus based on at least one of an individual view angle, a network state, a transceiving cycle, or a bandwidth of each screen. Thus, the 360-degree image is provided in high quality through the multi-screens even under a restricted network condition.

The aspects of the disclosure may be achieved by providing a computer program product including: a memory configured to store an instruction; and a processor, the instruction being executed by the processor to produce a plurality of split images corresponding to individual view angles of screens of the plurality of display apparatuses from each frame of a 360-degree image including a plurality of frames, transmit the plurality of split images according to the frames to the corresponding display apparatus, and control the communicator to transmit a split image updated corresponding to change in the individual view angle based on movement of a view point.

The instruction may be executed to receive information about whether a projection image displayed on a corresponding screen is displayed beyond a boundary area of the corresponding split image based on the individual view angle from at least one of the plurality of display apparatuses, and update the split image based on the received information.

The aspects of the disclosure may be achieved by providing a display apparatus including: an image processor configured to process an image signal; a display; a communicator configured to communicate with a server; and a controller configured to identify an individual view angle of a screen corresponding to the display apparatus among a plurality of screens based on a viewpoint according to a user input, receive a split image obtained corresponding to the identified individual view angle from each frame of a 360-degree image including a plurality of frames from the server, perform mapping the received split image to a three-dimensional image, and control the image processor to produce a projection image corresponding to the individual view angle from the mapping split image and display the projection image on the display. According to such an embodiment of the disclosure, the 360-degree image can be reproduced on the multi-screens, corresponding to the viewpoints of the screens. Further, the stream of the 360-degree image can be provided corresponding to the viewpoint and the view angle changed based on the user control with regard to the multi-screens.

The controller may transmit information about the identified individual view angle to the server, and receive the produced split image from the server based on the information about the transmitted individual view angle. Thus, it is possible to receive the split image corresponding to each screen of the 360-degree image by providing the information about the viewpoint and the view angle of the screen to the server.

The display apparatus may further include an input receiver configured to receive a user input, wherein, when the individual view angle is changed by the received user input, the controller receives a split image updated corresponding to the change in the individual view angle from the server. Thus, the updated split image is received by giving the sever the information about the viewpoint and the view angle of the screen changed based on the user control.

The controller may control the image processor to perform mapping the received split image to a spherical shape based on the individual view angle. Thus, to reproduce the 360-degree image, the split image received from the server is mapped to a spherical region corresponding to the viewpoint of the corresponding screen.

The controller may set a boundary area within the received split image, and receive an updated split image from the server and displays the received image when the projection image is displayed beyond the boundary area of the split image. Thus, the updated image is received when an image is displayed beyond a boundary area of the split image as the viewpoint and the view angle are changed by user control.

The controller may transmit a request for updating the corresponding split image to the server, based on order of a projection image displayed on a screen of the display apparatus beyond a boundary area of the corresponding split image among the plurality of screens. Thus, the screen, of which the viewpoint and the view angle are first changed based on the user control, may preferentially request the updated split image.

The controller may receive layout information about each frame of the 360-degree image from the server, and receives the split image based on the received layout information. Here, the layout information may include information about locations and sizes of split images respectively corresponding to a plurality of screens in a corresponding frame of a 360-degree image. Thus, when the multi-screens are connected in series to the server, each screen may receive the split images of the 360-degree image based on the layout information.

The aspects of the disclosure may be achieved by providing a computer program product including: a memory configured to store an instruction; and a processor, the instruction being executed by the processor to identify an individual view angle of a screen corresponding to the display apparatus among a plurality of screens based on a viewpoint according to a user input, receive a split image obtained corresponding to the identified individual view angle from each frame of a 360-degree image including a plurality of frames from the server, perform mapping the received split image to a three-dimensional image, and control the image processor to produce a projection image corresponding to the individual view angle from the mapping split image and display the projection image on the display.

The aspects of the disclosure may be achieved by providing a method of controlling a server, comprising: producing a plurality of split images corresponding to individual view angles of screens of the plurality of display apparatuses from each frame of a 360-degree image including a plurality of frames; transmitting the plurality of split images according to the frames to the corresponding display apparatus; and controlling the communicator to transmit a split image updated corresponding to change in the individual view angle based on movement of a view point.

According to such an embodiment of the disclosure, the 360-degree image can be reproduced on the multi-screens, corresponding to the viewpoints of the screens. Further, the stream of the 360-degree image can be provided corresponding to the viewpoint and the view angle changed based on the user control with regard to the multi-screens.

The transmitting of the updated split image may include receiving information about whether a projection image displayed on a corresponding screen is displayed beyond a boundary area of the corresponding split image based on the individual view angle from at least one of the plurality of display apparatuses, and updating the split image based on the received information. Thus, the updated image is provided to the corresponding screen when an image is displayed beyond a boundary area of the split image as the viewpoint and the view angle are changed by user control.

The transmitting of the updated split image may include transmitting the updated split images to the plurality of display apparatuses, based on order of a projection image displayed on each screen beyond a boundary area of the corresponding split image among the plurality of display apparatuses. Thus, the updated split image may be preferentially provided to the screen of which the viewpoint and the view angle are first changed based on the user control.

The method may include transmitting layout information about each frame of the 360-degree image to each of the plurality of display apparatuses, and transmitting the split image based on the transmitted layout information. Here, the layout information may include information about locations and sizes of split images corresponding to a plurality of screens in a corresponding frame of a 360-degree image. Thus, when the multi-screens are connected in series to the server, the split images of the 360-degree image may be provided to the screens based on the layout information.

The aspects of the disclosure may be achieved by providing a method of controlling a display apparatus, comprising: identifying an individual view angle of a screen corresponding to the display apparatus among a plurality of screens based on a viewpoint according to a user input, receiving a split image obtained corresponding to the identified individual view angle from each frame of a 360-degree image including a plurality of frames from the server, performing mapping the received split image to a three-dimensional image, and controlling the image processor to produce a projection image corresponding to the individual view angle from the mapping split image and display the projection image on the display.

According to such an embodiment of the disclosure, the 360-degree image can be reproduced on the multi-screens, corresponding to the viewpoints of the screens. Further, the stream of the 360-degree image can be provided corresponding to the viewpoint and the view angle changed based on the user control with regard to the multi-screens.

The method may include, when the individual view angle is changed by the received user input, receiving a split image updated corresponding to the change in the individual view angle from the server. Thus, the updated split image is received by giving the sever the information about the viewpoint and the view angle of the screen changed based on the user control.

The mapping to a three-dimensional image may include mapping the received split image to a spherical shape based on the individual view angle. Thus, to reproduce the 360-degree image, the split image received from the server is mapped to a spherical region corresponding to the viewpoint of the corresponding screen.

The method may include setting a boundary area within the received split image, and receiving an updated split image from the server and displaying the received image when the projection image is displayed beyond the boundary area of the split image.

Thus, the updated image is provided to the corresponding screen when an image is displayed beyond a boundary area of the split image as the viewpoint and the view angle are changed by user control.

As described above, according to the disclosure, a 360-degree image is effectively reproduced on multi-screens. Further, it is possible to provide a 360-degree image corresponding to change in a viewpoint and a view angle based on user control.

Further, according to the disclosure, a 360-degree image is provided in high quality through multi-screens even under a restricted network condition.

BRIEF DESCRIPTION OF THE DRAWINGS

FIG. 14 illustrates an example of updating a split image corresponding to change in a view angle based on user control according to an embodiment of the disclosure.

FIG. 15 illustrates an example of displaying a projection image based on user control according to an embodiment of the disclosure.

DETAILED DESCRIPTION OF EXAMPLE EMBODIMENTS

Hereinafter, exemplary embodiments will be described in detail with reference to accompanying drawings so as to be easily realized by a person having ordinary skill in the art. The disclosure may be achieved in various different forms and not limited to the embodiments set forth herein.

Figure 1:
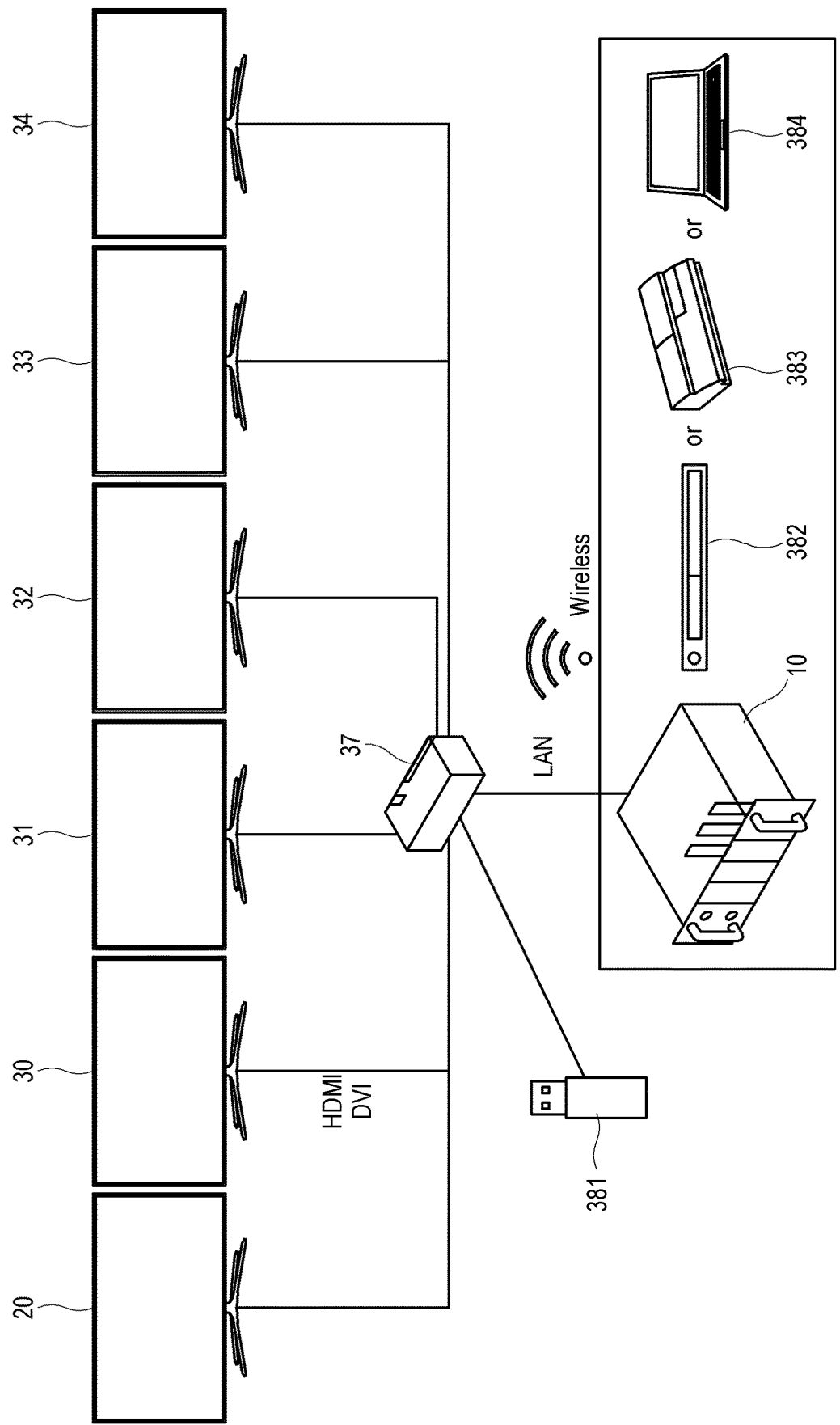
FIG. 1 illustrates a configuration between a server and a plurality of display apparatuses according to an embodiment of the disclosure.

FIG. 1 illustrates a configuration between a server and a plurality of display apparatuses according to an embodiment of the disclosure. As shown in FIG. 1, a server 10 is connected to a splitter 37, and a plurality of display apparatuses 20, 30, 31, 32, 33 and 34 are connected in parallel to the splitter 37. The server 10 communicates with the splitter 37 through a local region network (LAN) or a wireless communication method, and content and information of a 360-degree image (refer to '950' in FIG. 3) are transmitted and received between them. Here, the 360-degree image 950 is produced by stitching two or more images respectively photographed by two or more lenses, and is thus viewable in all directions.

The splitter 37 connects with each of the plurality of display apparatuses 20, 30, 31, 32, 33 and 34 through high-definition multimedia interface (HDMI) or a digital visual interface (DVI).

The splitter 37 receives a plurality of split images (refer to '91', '92', . . . in FIG. 3), which are produced from each frame of the 360-degree image 950, from the server 10, and distributively transmits the plurality of received split images 91, 92, . . . to the corresponding display apparatuses 20, 30, 31, 32, 33 and 34.

Alternatively, the splitter 37 may connect with a universal serial bus (USB) device 381 in which the 360-degree image 950 is stored. In this case, the splitter 37 receives the 360-degree image 950 stored in the USB device 381, performs a process of producing the plurality of split images 91, 92, . . . corresponding to the plurality of display apparatuses 20, 30, 31, 32, 33 and 34 from each frame of the 360-degree image 950, and distributively transmits the produced split images 91, 92, . . . to the corresponding display apparatuses 20, 30, 31, 32, 33 and 34.

Besides, the splitter 37 may connect with a Blu-ray disc 382, a PS3 383, a laptop computer 384, etc., and receive and distributively transmit the 360-degree image 950 stored in or a plurality of previously processed split images 91, 92, . . . from them to the display apparatuses 20, 30, 31, 32, 33 and 34.

Figure 2:
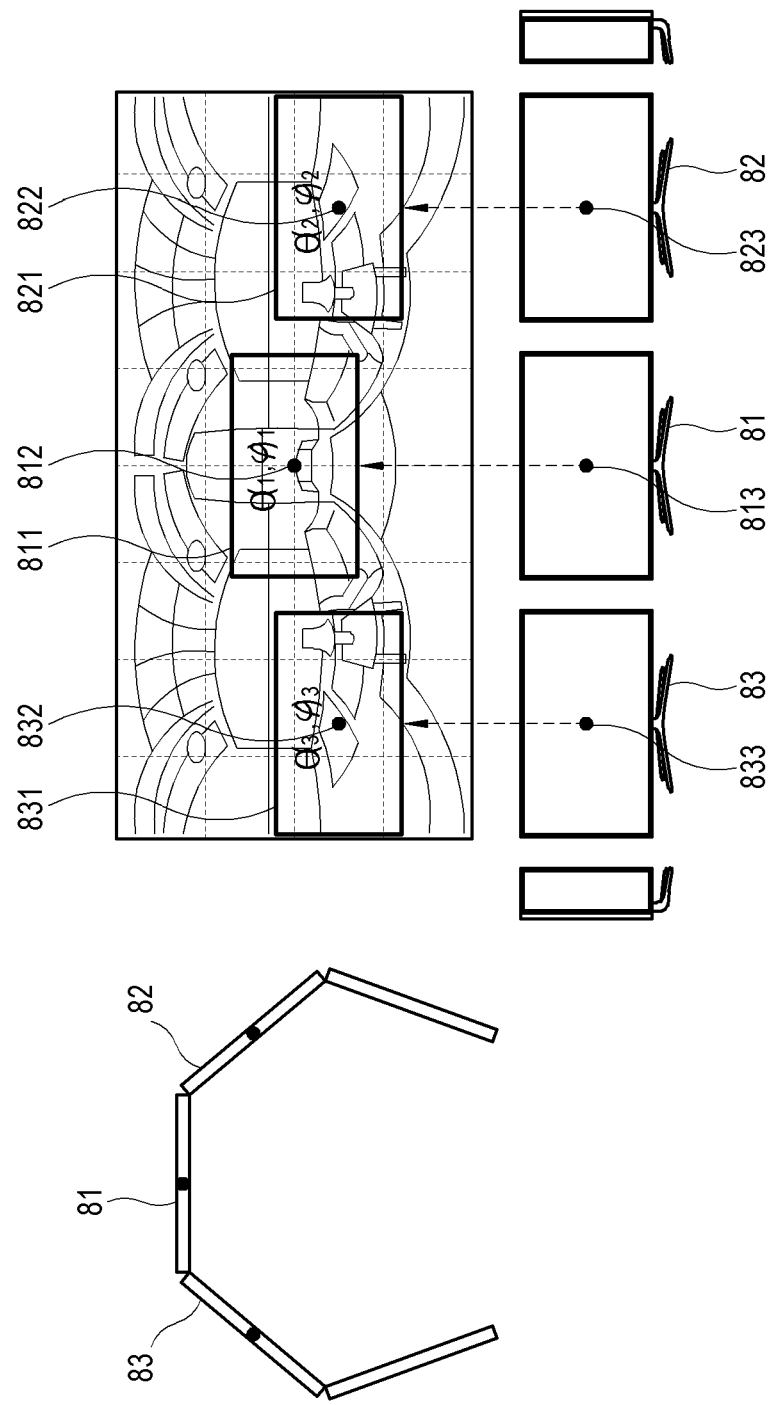
FIG. 2 illustrates an example of projecting a 360-degree image on multi-screens according to an embodiment of the disclosure.

FIG. 2 illustrates an example of projecting a 360-degree image on multi-screens according to an embodiment of the disclosure. As shown in FIG. 2, projection images 811, 821, 831, . . . are produced with respect to projection centers 812, 822, 832, . . . corresponding to viewpoints 813, 823, 833, . . . of the screens and displayed on the screens 81, 82, 83, . . . to reproduce a 360-degree image 950 on multi-screens 81, 82, 83, . . . In this case, the viewpoints 813, 823, 833, . . . and the view angles of the screens are varied depending on distances between the screens 81, 82, 83, . . . and the sizes of screens 81, 82, 83, . . . .

Here, the projection images 811, 821, 831, . . . displayed on the screens 81, 82, 83, . . . are produced based on the view angles of the screens 81, 82, 83, . . . , the viewpoints 813, 823, 833, . . . of the screens, various projection methods, etc.

For example, as shown in FIG. 15, a projection image 901 may be generated corresponding to a wide area of the 360-degree image 950 when the view angle is large, and a projection image 902 may be generated corresponding to a narrow area of the 360-degree image 950 when the view angle is small.

Further, when the projection method is a rectilinear projection, a projection image 903 may be generated by mapping a part of a spherical surface to a planar image.

When the projection method is a stereographic projection, a projection image 904 may be generated by projecting the whole sphere to a planar surface As described above, the projection method used for the screens 81, 82, 83, . . . may be properly identified in consideration of an aspect ratio, a curvature, etc. of the screens.

Figure 3:
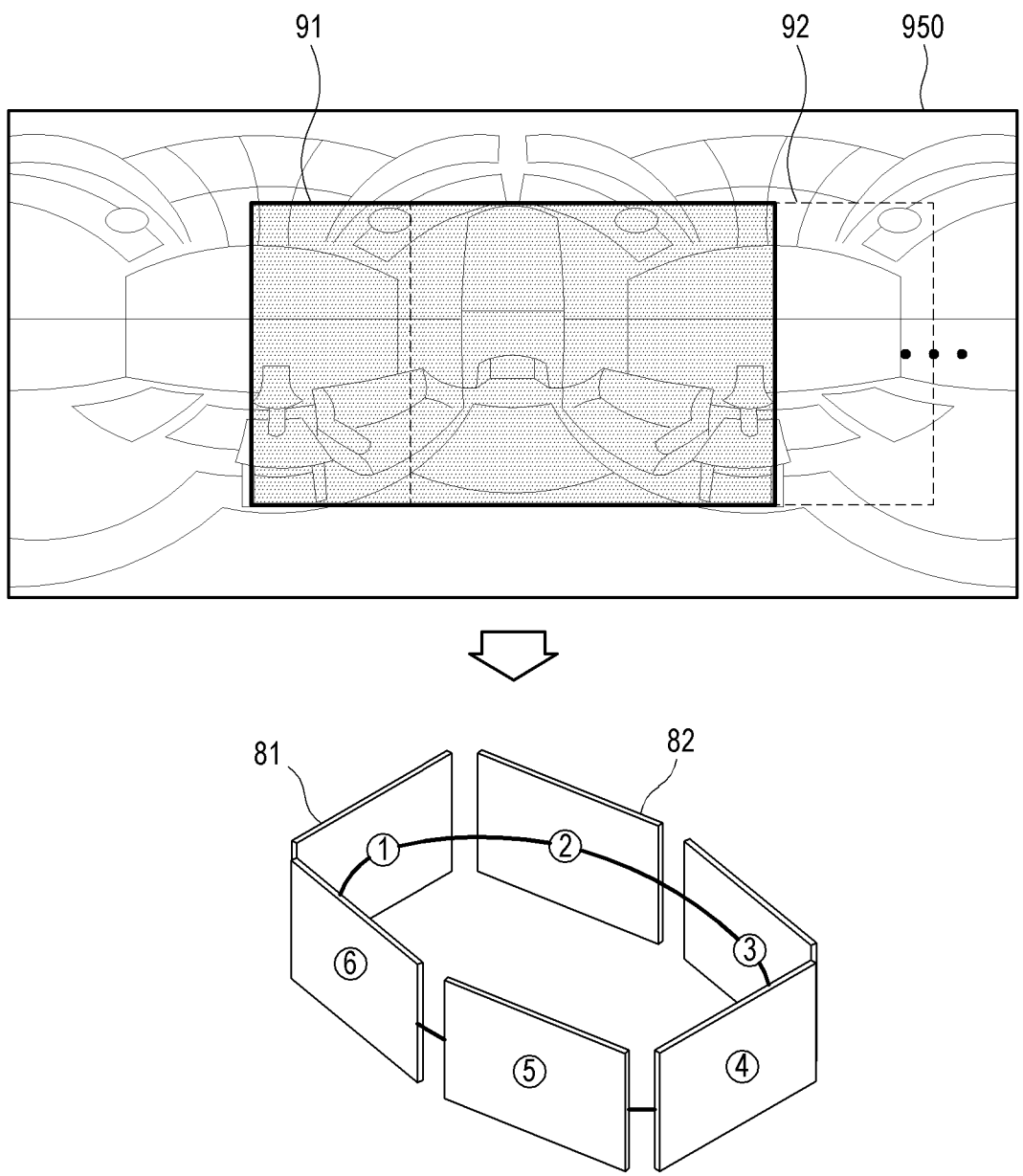
FIG. 3 illustrates an example of generating a split image corresponding to each screen from a 360-degree image according to an embodiment of the disclosure.

FIG. 3 illustrates an example of generating a split image corresponding to each screen from a 360-degree image according to an embodiment of the disclosure. As shown in FIG. 3, the server 10 produces a plurality of split images 91, 92, . . . corresponding to screens 81, 82, . . . from a 360-degree image 950. In this case, the split images 91, 92, . . . are produced by cropping regions corresponding to viewpoints of the screens 81, 82, . . . from the 360-degree image 950.

For example, in a case of six screens 81, 82, . . . , the server 10 may transmit the plurality of split images 91, 92, . . . having a resolution of 4K every frame to a plurality of display apparatuses (see 20, 30, . . . in FIG. 1) corresponding to the screens 81, 82, . . . , in a state that the 360-degree image 950 having a resolution of 8K is stored. In this case, the split images 91, 92, . . . are obtained by cropping the regions corresponding to the resolution of 4K with respect to the positions corresponding to the viewpoints of the screens 81, 82, . . . from the whole regions of the 360-degree image 950.

The server 10 transmits the plurality of split images 91, 92, . . . generated from each frame of the 360-degree image 950 to the corresponding display apparatuses 20, 30, . . . .

Here, to reduce a streaming data amount when the split images 91, 92, . . . are transmitted, the server 10 may generate a split image corresponding to a central region of the 360-degree image 950 to have high quality, and generate split images corresponding to the other regions to have low quality. Besides such a method, the data amounts of the split images 91, 92, . . . may be varied depending on input limited resolutions, network states, transceiving cycles, and bandwidths of the display apparatuses corresponding to the screens 81, 82, . . . .

Further, while transmitting the plurality of split images 91, 92, . . . to the plurality of display apparatuses 20, 30, . . . , the server 10 also transmits information about an angle at the center of the split image, horizontal and vertical view angles of the split image, etc. The display apparatuses 20, 30, . . . may perform mapping the split images 91, 92, . . . to a spherical shape (see 120 in FIG. 4) based on the information received from the server 10.

Figure 4:
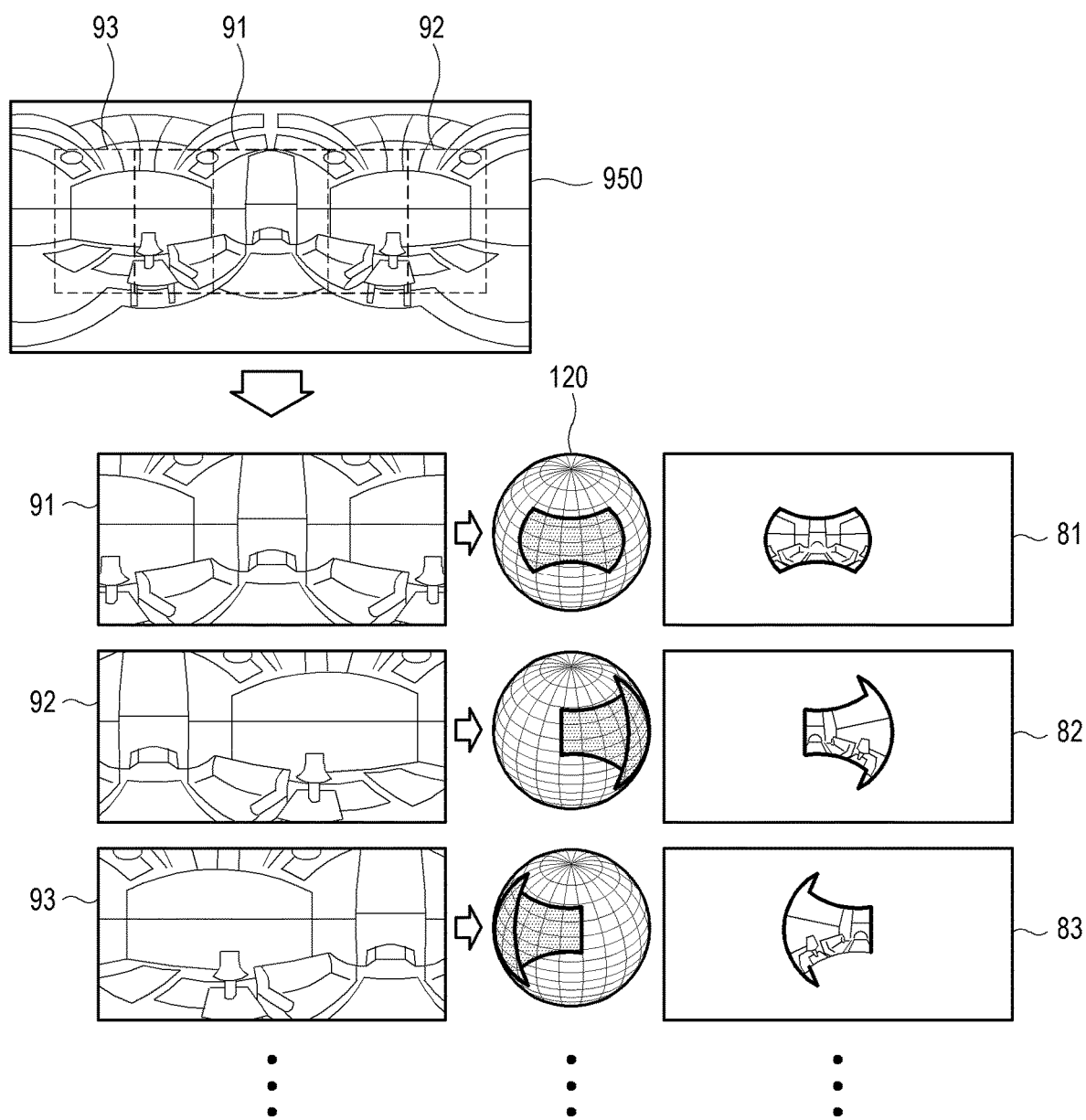
FIG. 4 illustrates an example of mapping a split image corresponding to each screen to a sphere according to an embodiment of the disclosure.

FIG. 4 illustrates an example of mapping split images corresponding to screens to a sphere according to an embodiment of the disclosure. As shown in FIG. 4, the server 10 produces the split images 91, 92, 93 . . . corresponding to the screens 81, 82, 83, . . . from the 360-degree image 950. The split images 91, 92, 93, . . . are transmitted to the display apparatuses (see 20, 30, 31, . . . in FIG. 1) including the corresponding screens 81, 82, 83, . . . .

The display apparatuses 20, 30, 31, . . . employ a central processing unit (CPU) or a graphic processing unit (GPU) to perform texture mapping for the split images 91, 92, 93, . . . transmitted from the server 10 to a spherical shape 120. In this case, the display apparatuses 20, 30, 31, . . . performs mapping the split images 91, 92, 93, . . . to the spherical shape 120 based on the information about the angle at the center, the horizontal and vertical view angles, etc. of the split images 91, 92, 93, . . . provided by the server 10.

Here, when the split images 91, 92, 93, . . . are a part of the 360-degree image 950, only a part of the spherical shape 12 is subjected to the mapping. When the split images 91, 92, 93, . . . correspond to the whole 360-degree image 950, the whole spherical shape 120 is subjected to the mapping.

Further, alternatively, the split images 91, 92, 93, . . . may be mapped to not the spherical shape 120 but a panorama, a cylinder, a cone or the like shape according to a viewing form, the number and arranged form of screens, etc. of the 360-degree image 950.

Figure 5:
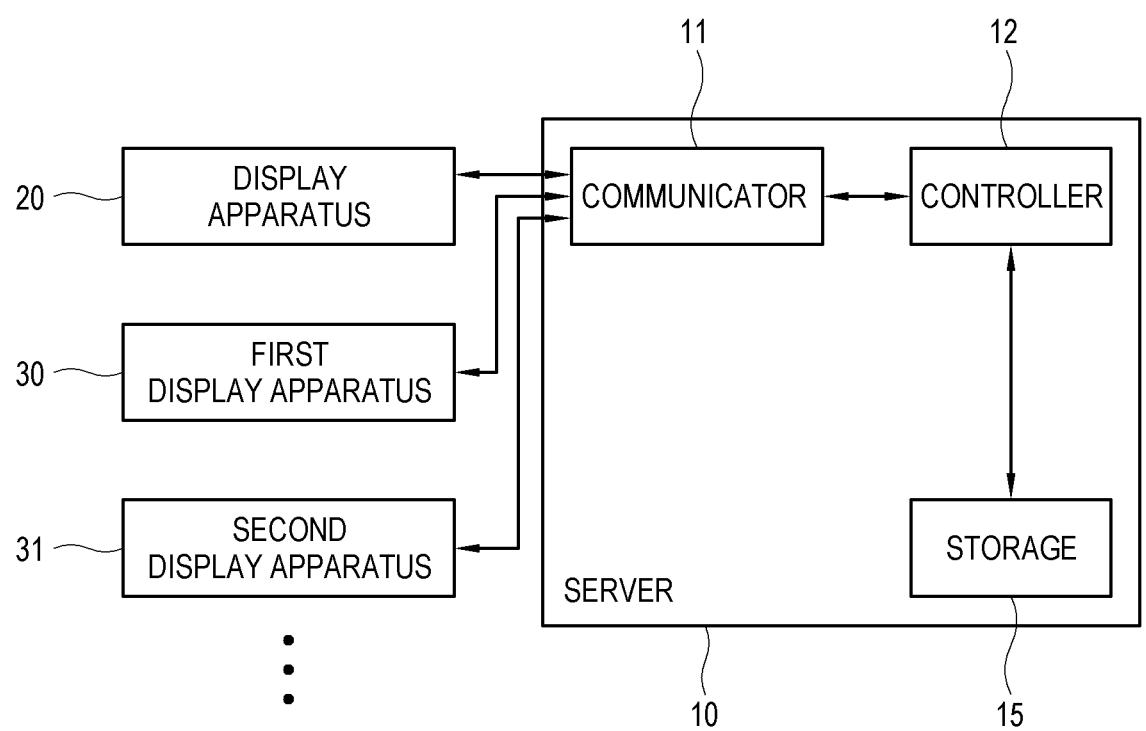
FIG. 5 is a block diagram illustrating a configuration of a server according to an embodiment of the disclosure.

FIG. 5 is a block diagram illustrating a configuration of a server according to an embodiment of the disclosure. As shown in FIG. 5, the server 10 includes a communicator 11, a controller 12, and a storage 15, and communicates with a plurality of display apparatuses 20, 30, 31, . . . through the communicator 11. In this case, the plurality of display apparatuses 20, 30, 31, . . . are connected in parallel to the server 10.

However, there are no limits to the configuration of the server 10. For example, when a display apparatus is provided as the server 10, the server 10 may further include an image receiver (not shown), an image processor (not shown), and a display (not shown).

The communicator 11 employs a wireless or wired communication method to communicate with the plurality of display apparatuses 20, 30, 31, . . . . The communicator 11 may use Ethernet or the like wired communication method to communicate with the plurality of display apparatuses 20, 30, 31, . . . , or use Wi-Fi, Bluetooth or the like wireless communication method to communicate with the plurality of display apparatuses 20, 30, 31, . . . through a wireless router. There are no limits to the communication method of the communicator 11, and the communicator 11 may use another communication method.

According to an embodiment, the communicator 11 may connect with a splitter 37 as shown in FIG. 1, without directly communicating with the plurality of display apparatuses 20, 30, 31, . . . In this case, the communicator 11 transmits data to the splitter 37, so that the splitter 37 can split data and transmit the split data to the plurality of display apparatuses 20, 30, 31, . . . .

The storage 15 is configured to store the 360-degree image 950 received from an external device. The storage 15 makes each piece of the data of the stored 360-degree image 950 undergo reading, writing, edition, deleting, update, etc. The storage 15 may be materialized as a nonvolatile memory such as a flash memory, a hard disk drive, etc. to retain data regardless of whether the display apparatus 20 is powered on or off.

The controller 12 receives information about each individual view angle of the screens 81, 82, 83, . . . . Each individual view angle of the screens 81, 82, 83, . . . is varied depending on the viewpoint based on user control.

In this case, information about the view angles of the screens 81, 82, 83, . . . may be received in response to a viewpoint moving command for the display apparatus 20, which a user controls, among the plurality of display apparatuses 20, 30, 31, . . . . In an alternative case, information about the view angles may be included in a control signal received from a user input device, e.g. a remote controller or the like for controlling operation of at least one of the server 10 and the plurality of display apparatuses 20, 30, 31, . . . .

The controller 12 produces a plurality of split images 91, 92, 93, . . . corresponding to individual view angles of the screens 81, 82, 83, . . . of the plurality of display apparatuses 20, 30, 31, . . . from respective frames of the 360-degree image 950 including the plurality of frames. In this case, the 360-degree image 950 may be stored in the storage 15, or may be for example received from the USB device 381, the Blu-ray disc 382, the PS3 383, the laptop computer 384, and the like connected to the server 10.

The controller 12 transmits the plurality of split images 91, 92, 93, . . . produced corresponding to the frames to the display apparatuses 20, 30, 31, . . . .

Further, when the information about each individual view angle changed based on user control is received from the display apparatuses 20, 30, 31, . . . , the controller 12 updates the split images 91, 92, 93, . . . with the regions corresponding to the changed individual view angles in the 360-degree image 950.

Figure 6:
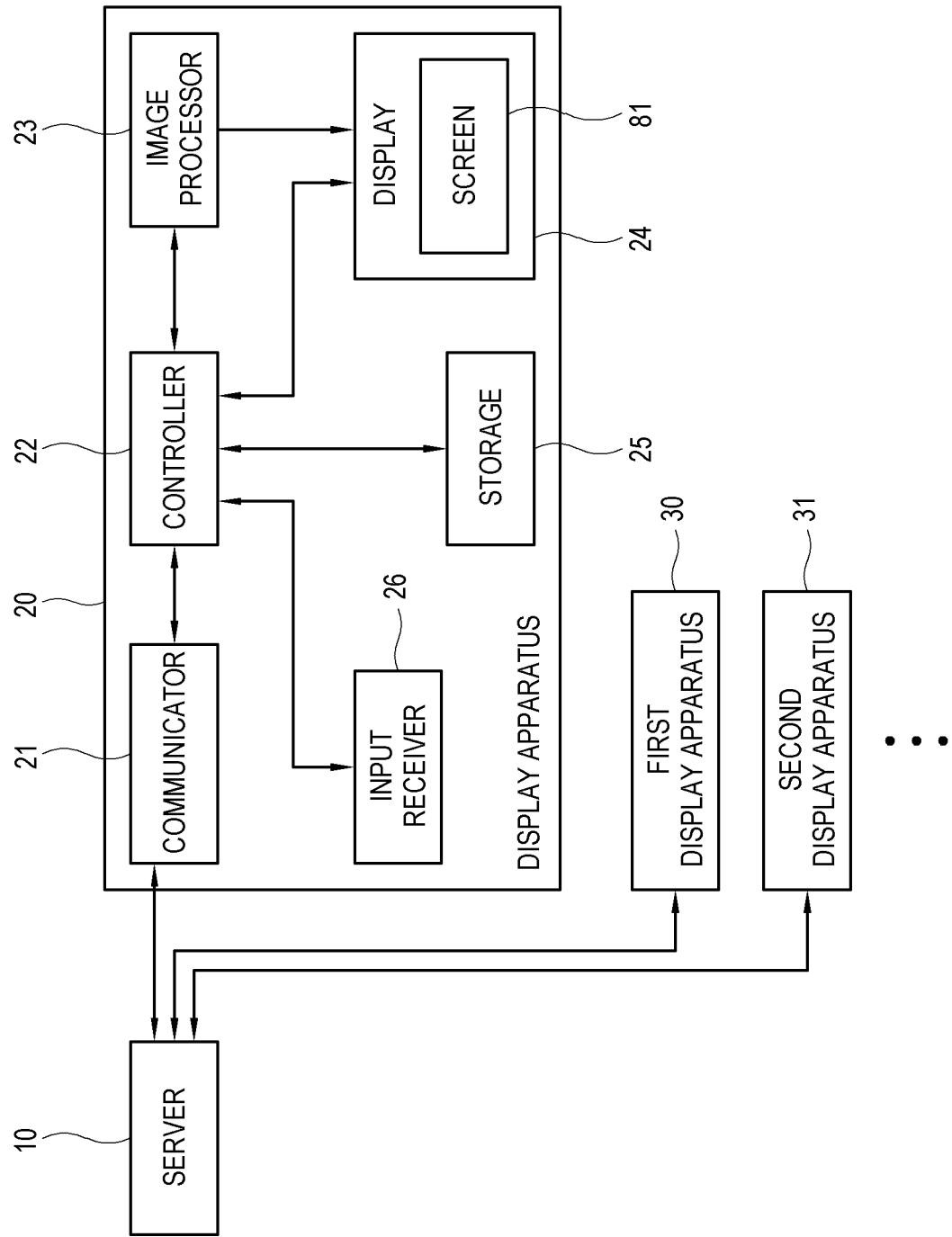
FIG. 6 is a block diagram illustrating a configuration of a display apparatus according to an embodiment of the disclosure.

FIG. 6 is a block diagram of a display apparatus according to one embodiment of the disclosure. As shown in FIG. 6, the display apparatus 20 includes a communicator 21, a controller 22, an image processor 23, a display 24, a storage 25 and an input receiver 26, and communicates with a server 10 and a plurality of display apparatuses 30, 31 . . . through the communicator 21. In this case, the display apparatus 20 and the plurality of display apparatuses 30, 31 . . . are connected in parallel to the server 10. The display apparatus 20 may for example include a TV, a smartphone, a projector, an HMD, etc. There are no limits to the elements of the display apparatus 20, and the display apparatus 20 may include another element.

The communicator 21 communicates with the server 10 wirelessly or by a wire. The communicator 21 may communicate with the server 10 by a wired communication method such as Ethernet, etc., or communicate with the server 10 through a wireless router by a wireless communication method such as Wi-Fi, Bluetooth, etc. There are no limits to the communication method of the communicator 21, and the communicator 21 may use another communication method.

According to one embodiment, the communicator 21 may be not directly connected to the server 10 but may be connected to the splitter 37 as shown in FIG. 1. In this case, the communicator 21 may receive data, which is split by the splitter 37, from the server 10 through the splitter 37.

The input receiver 26 is configured to receive a user input for controlling at least one function of the display apparatus 20. For example, the input receiver 26 may receive a user input for selecting a part of a user interface (UI) displayed on the display 24. The input receiver 26 may be provided as an input panel provided outside the display apparatus 20 or as a remote controller capable of performing infrared communication with the display apparatus 20. Further, the input receiver 26 may be materialized as a keyboard, a mouse, etc. connected to the display apparatus 20, and may be materialized as a touch screen provided on the display apparatus 20.

The storage 25 is configured to store a split image 91 received from the server 10. The split image 91 is obtained by cutting a region corresponding to each individual view angle of a screen 81 from the whole region of the 360-degree image 950. The storage 25 makes the data of the stored split image 91 undergo reading, writing, edition, deleting, update, etc. The storage 25 may be materialized as a nonvolatile memory such as a flash memory, a hard disk drive, etc. to retain data regardless of whether the display apparatus 20 is powered on or off.

The image processor 23 performs imaging processing processes with regard to the split image 91 stored in the storage 25. Further, the image processor 23 performs imaging processing processes with regard to a projection image see 811 produced corresponding to each individual view angle of the screen 81 from the split image 91 mapped onto the sphere 120. As examples of the imaging processing processes performed in the image processor 23, there are demultiplexing, decoding, de-interlacing, scaling, noise reduction, detail enhancement, etc. without limitations. The image processor 23 may be materialized as a system on chip (SOC) where many functions are integrated, or as individual elements for independently performing each process.

The display 24 includes the screen 81 which displays an image based on an image signal processed by the image processor 23. There are no limits to the types of the display 24, and the display 24 may be materialized in various types such as a plasma display panel (PDP), a liquid crystal display (LCD), an organic light emitting diode (OLED), a flexible display, etc.

The controller 22 identifies each individual view angle of the screen 81, which corresponds to the display apparatus 20, among the plurality of screens 81, 82, 83, . . . based on a viewpoint corresponding to a user input received in the input receiver 26.

The controller 22 transmits information about each identified individual view angle to the server 10. The controller 22 receives a split image 91 obtained corresponding to each individual view angle, which is transmitted from each frame of the 360-degree image 950 including the plurality of frames, from the server 10.

The controller 22 performs mapping the split image 91 received from the server 19 to the spherical shape 120. In this case, the controller 22 performs mapping the split image 91 to the corresponding region of the spherical shape 120 based on the information about the angle at the center, the horizontal and vertical view angles, etc. of the split image 91 provided by the server 10.

The controller 22 controls the image processor 23 to produce a projection image 811 corresponding to each individual view angle from the mapping split image 91 and display the projection image 811 on the display 24.

Here, the controller 22 receives the split image 91 updated corresponding to the change in the individual view angle from the server 10 when the individual view angle is changed in response to a received user input. Thus, the controller 22 controls the display 24 to display the projection image 811 changed corresponding to the updated split image 91.

Figure 7:
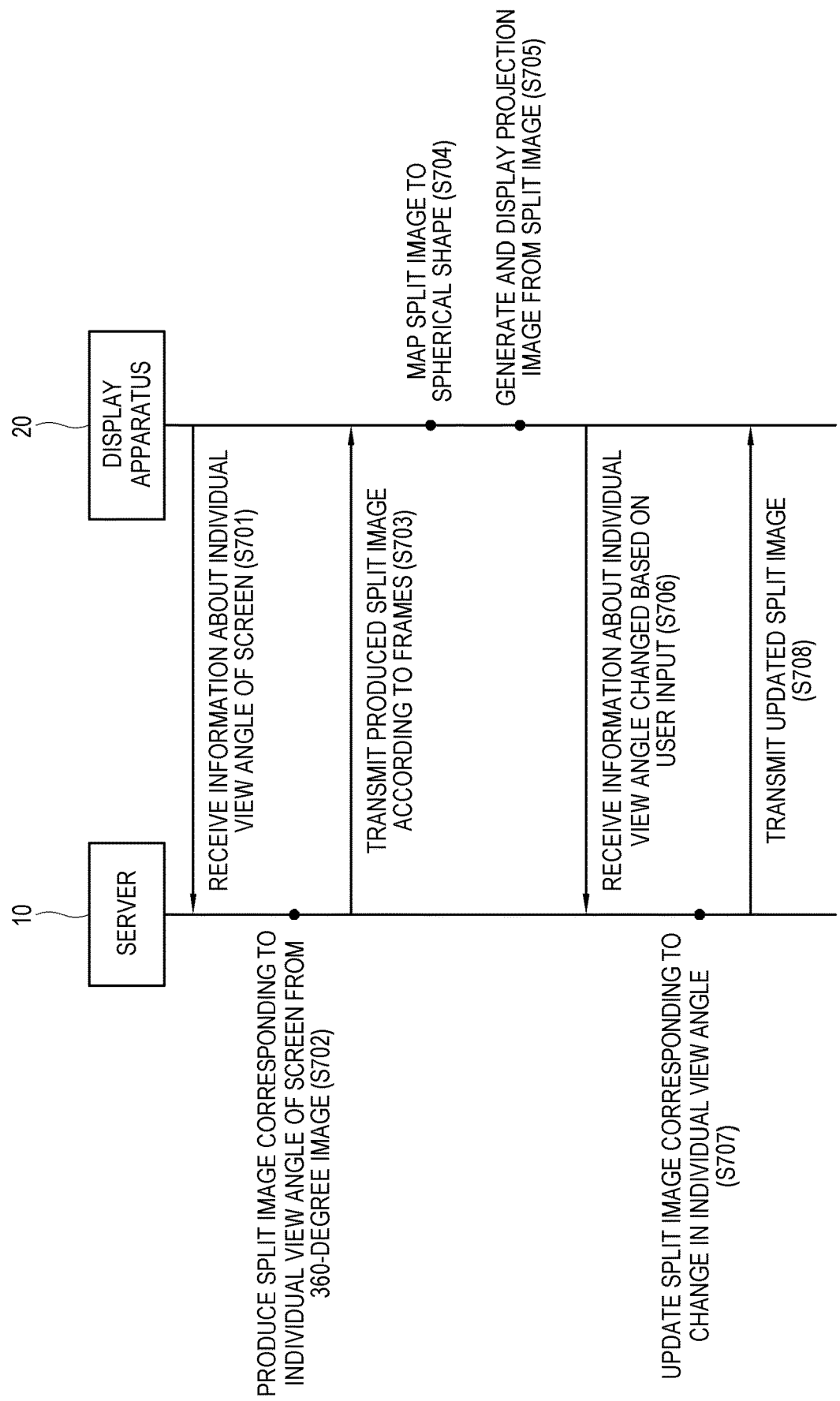
FIG. 7 is a flowchart of operations between a server and a display apparatus according to an embodiment of the disclosure.

FIG. 7 is a flowchart of operations between a server and a display apparatus according to an embodiment of the disclosure. As shown in FIG. 7, at operation S701, the server 10 first receives information about the individual view angle of the screen 81 from the display apparatus 20.

Next, at operation S702, the server 10 produces the split image 91 corresponding to the screen 81 from the 360-degree image 950. Here, the individual view angle of the screen 81 is identified by the viewpoint based on a user input to the display apparatus 20.

At operation S703, the server 10 transmits the split image 91 produced according to the frames to the corresponding display apparatus 20.

At operation S704, the display apparatus 20 maps the split image 91 to the spherical shape 120. Next, at operation S705, the display apparatus 20 produces and displays the projection image (see 811 in FIG. 2) corresponding to the individual view angle from the mapping split image 91.

In this case, the display apparatus 20 may for example apply the rectilinear projection or the stereographic projection to produce the projection image 811. Besides the foregoing projection method, various projection methods may be applied taking an aspect ratio, a curvature, etc. of the screen into account.

At operation S706, the server 10 receives information about the individual view angle changed based on a user input. Next, at operation S707, the server 10 updates the split image 91 in response to the change in the individual view angle. Last, at operation S708, the server 10 transmits the updated split image 91 to the display apparatus 20.

As described above, according to the disclosure, the 360-degree image can be reproduced on the multi-screens, corresponding to the viewpoints of the screens. Further, the stream of the 360-degree image can be provided corresponding to the viewpoint and the view angle changed based on the user control with regard to the multi-screens.

Figure 8:
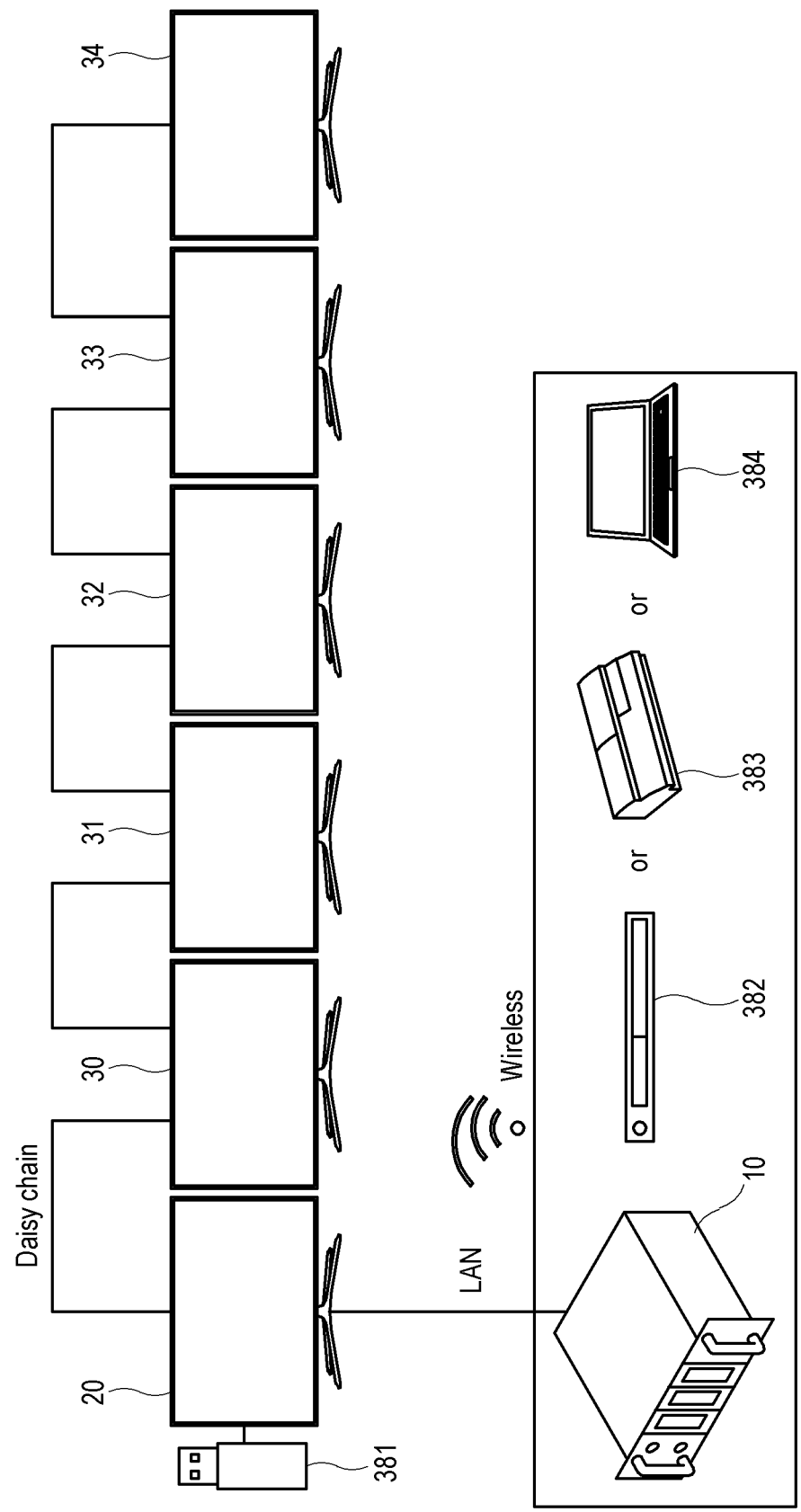
FIG. 8 illustrates a configuration between a server and a plurality of display apparatuses according to an embodiment of the disclosure.

FIG. 8 illustrates a configuration between a server and a plurality of display apparatuses according to one embodiment of the disclosure. As shown in FIG. 8, the server 10 connects with one display apparatus 20 among the plurality of display apparatuses 20, 30, 31, 32, 33 and 34. In this case, the plurality of display apparatuses 20, 30, 31, 32, 33 and 34 are connected in series. For example, the display apparatus 20 connected to the server 10 in a daisy chain scheme bypasses a signal to other display apparatuses 30, 31, 32, 33 and 34.

The server 10 communicates with the display apparatus 20 through a LAN or a wireless communication method, and content and information of the 360-degree image 950 are transmitted and received between them.

According to one embodiment, the server 10 may transmit one frame of the 360-degree image 950 having a resolution of 8K and layout information about the 360-degree image 950 to the display apparatus 20. Here, the layout information includes the locations and sizes of the split images 91, 92, 93, . . . respectively corresponding to the plurality of screens 81, 82, 83, . . . in the frame of the 360-degree image 950.

In this case, the display apparatus 20 may produce the split image 91 by cropping a region corresponding to the screen 81 from the frame of the received 360-degree image 950, based on the layout information received from the server 10.

Next, the display apparatus 20 transmits the layout information and the 360-degree image 950 received from the server 10 to a connected first display apparatus 30.

The first display apparatus 30 may produce a split image 92 by cropping a region corresponding to the screen 82 from the frame of the 360-degree image 950, based on the layout information received from the display apparatus 20.

Likewise, the first display apparatus 30 may transmit the 360-degree image 950 and the layout information to the second display apparatus 31, and make the second display apparatus 32 produce a corresponding split image 93.

As described above, when the plurality of display apparatuses 20, 30, 31, 32, 33 and 34 are connected in series to the server 10, each of the display apparatuses 20, 30, 31, 32, 33 and 34 is configured to produce the split image in such a manner that one display apparatus 20 bypasses the layout information and the 360-degree image 950 received from the server 10 to another first display apparatus 30.

Further, the display apparatus 20 may be connected to the USB device 381, the Blu-ray disc 382, the PS3 383, the laptop computer 384, and the like which are storing the 360-degree image 950. In this case, the display apparatus 20 receives the 360-degree image 950 stored in the USB device 381 or the like, and produce the split image 91 from the 360-degree image 950 based on the layout information received from the server 10.

Alternatively, a network state and an input resolution of the display apparatus 20 may be taken into account, to adjust the data amount of the 360-degree image 950 to be transmitted from the server 10 to the display apparatus 20.

Figure 10:
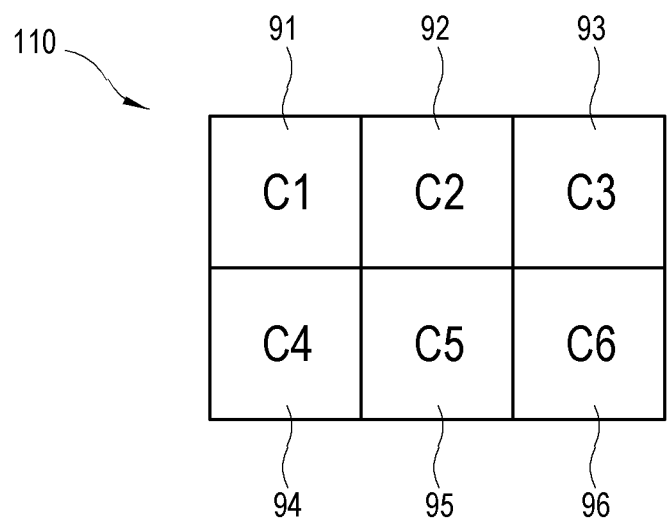
FIG. 10 illustrates an example of a split image provided to a display apparatus according to an embodiment of the disclosure.

For example, as shown in FIG. 10, when the display apparatus 20 is capable of receiving only an image having the resolution of 4K, the server 10 may transmit an integrated image having the resolution of 4K (see 110 in FIG. 10) corresponding to a part of the 360-degree image 950 having the resolution of 8K to the display apparatus 20.

That is, the server 10 may produce a plurality of split images 91, 92, 93, 94, 95, and 96 in such a manner of cropping regions corresponding to resolutions of ⅔K from the 360-degree image 950, and transmit the integrated image 110 having the resolution of 4K and the layout information to the display apparatus 20. Thus, the display apparatus 20 receives the split image 91 having the corresponding resolutions of ⅔K of the integrated image 110 based on the layout information. Likewise, other display apparatuses 30, 31, 32, 33 and 34 also receive the split images 92, 93, 94, 95 and 96 having the resolutions of ⅔K from the integrated image 110 having the resolution of 4K transmitted in a daisy chain scheme.

Figure 9:
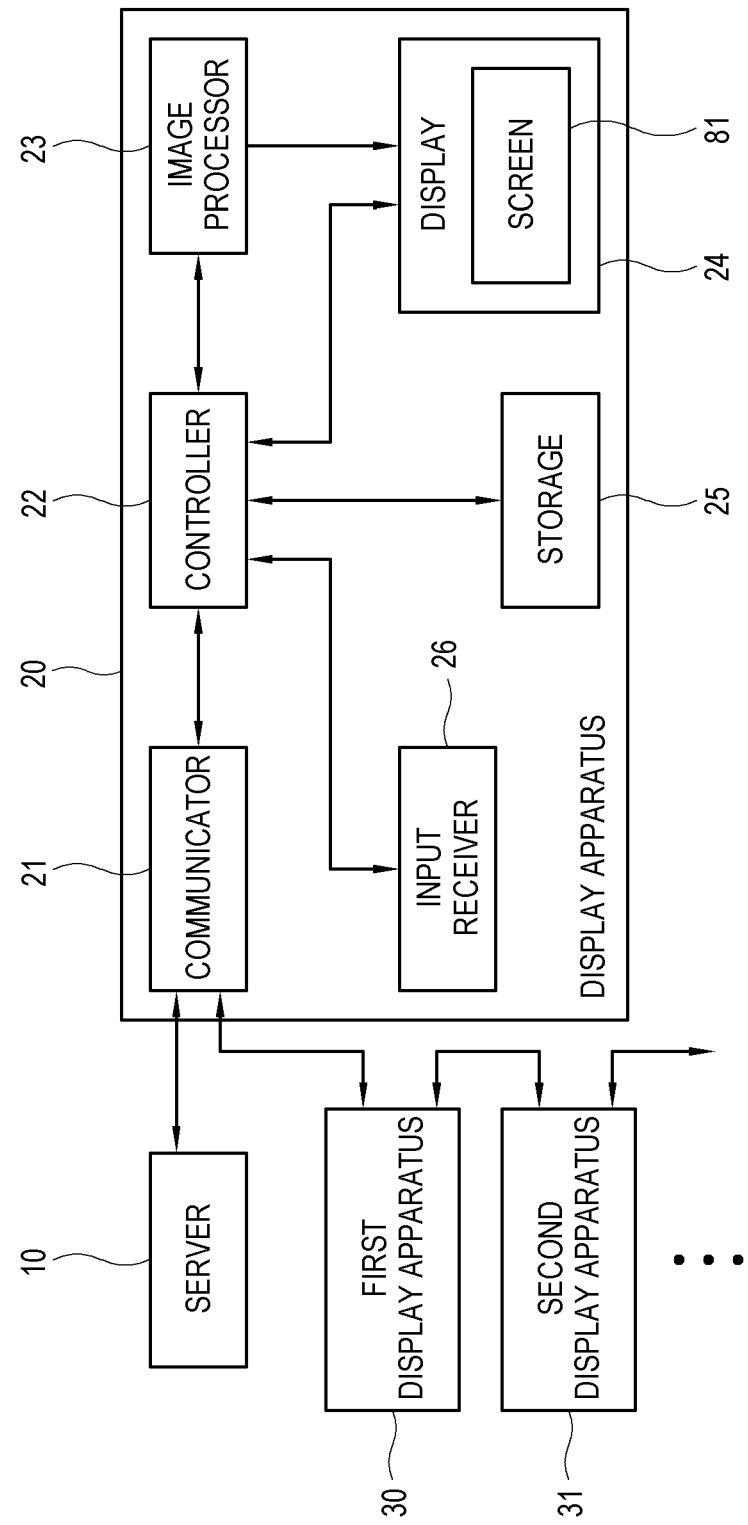
FIG. 9 is a block diagram of a display apparatus according to an embodiment of the disclosure.

FIG. 9 is a block diagram of a display apparatus according to one embodiment of the disclosure. As shown in FIG. 9, the display apparatus 20 includes the communicator 21, the controller 22, the image processor 23, the display 24, the storage 25 and the input receiver 26, and communicates the server 10 and the display apparatus 30 through the communicator 21. The display apparatus 20 may for example include a TV, a smartphone, a projector, an HMD, etc. There are no limits to the elements of the display apparatus 20, and the display apparatus 20 may further include another element. Here, the elements of the display apparatus 20 are the same as those of FIG. 6, and thus only different features will be described avoiding the repetitive descriptions.

In the illustrated configuration, the display apparatus 20 and the plurality of display apparatuses 30, 31 . . . are connected in series to the server 10, and may for example connected in the daisy chain scheme.

That is, the display apparatus 20 transmits a signal and data from the server 10 to the first display apparatus 30, and similarly the first display apparatus 30 transmits the signal and data to the second display apparatus 31.

According to an embodiment, the controller 22 may receive the integrated image (see 110 in FIG. 10), into which the plurality of split images 91, 92, . . . corresponding to the plurality of display apparatuses 20, 30, 31, . . . are integrated, from the server 10.

In this case, the controller 22 may receive the integrated image 110 and the layout information about the integrated image 110 from the server 10, and obtain the split image 91 from the integrated image 110 based on the layout information. Here, the layout information includes the locations and sizes of the split images 91, 92, . . . respectively corresponding to the plurality of screens 81, 82, . . . within the integrated image 110.

Further, the controller 22 transmits the integrated image 110 and the layout information, which are received from the server 10 as described above, to a connected first display apparatus 30. Therefore, the first display apparatus 30 obtains the corresponding split image 92 from the integrated image 110 based on the layout information received from the display apparatus 20.

Figure 11:
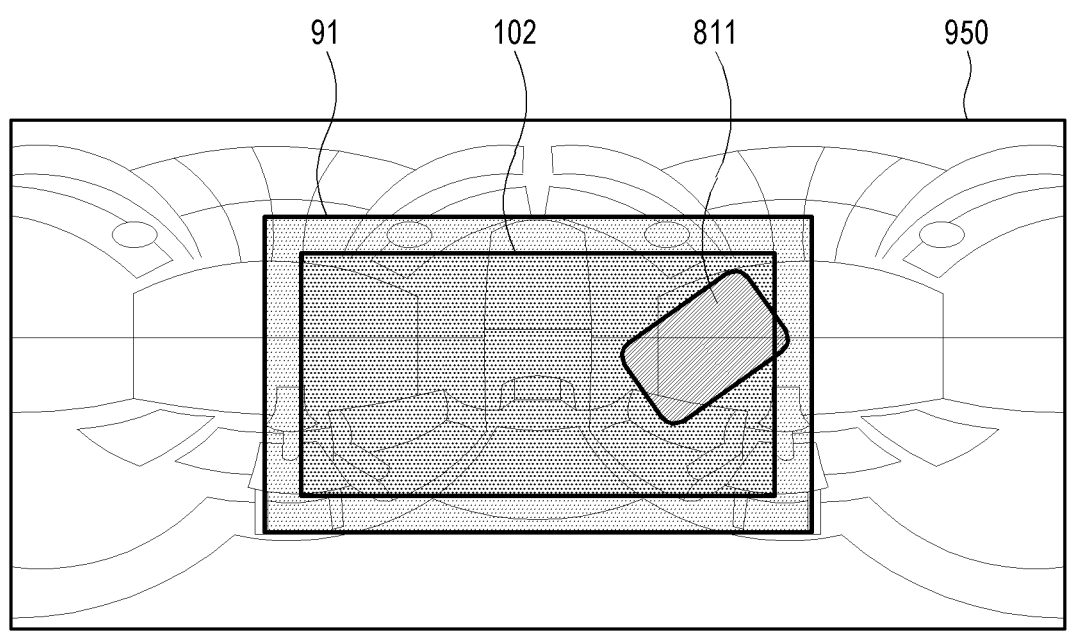
FIG. 11 illustrates an example that a projection image is displayed beyond a boundary of a split image according to an embodiment of the disclosure.

FIG. 11 illustrates an example that a projection image is displayed beyond a boundary of a split image according to an embodiment of the disclosure. As shown in FIG. 11, the display apparatus 20 receives the split image 91, which is produced from each frame of the 360-degree image 950, from the server 10.

The display apparatus 20 produces the projection image 811 by calculating an area to be displayed on the screen 81 within the received split image 91. In this case, the area to be displayed on the screen 81 is calculated based on the viewpoint, the view angle, the projection method, etc. of the screen 81.

To stably display the projection image 811, a boundary area 102 is set to have a range of a certain width inside the boundary of the split image 91.

That is, the width between the boundary of the split image 91 and the boundary area 102 is set enough to secure time taken until the split image 91 is received after making an update request while the display apparatus 20 receives the split image 91 from the server 10 in a predetermined cycle.

For example, in a case where the split image 91 is received every 10 seconds, the width between the boundary of the split image 91 and the boundary area 102 may be set enough to stably display the projection image 811 without an error until the next section of 10 seconds during which the split image 91 received in the first section of 10 seconds is updated.

In the illustrated example, when the viewpoint or the view angle of the screen 81 is changed based on user control, the projection image 811 may be displayed beyond the boundary area 102 of the received split image 91. Here, it may be identified in the screen 81 and then transmitted to the server 10, or may be identified in the server 10 itself whether the projection image 811 is displayed beyond the boundary area 102.

As described above, when the projection image 811 is displayed beyond the boundary area 102 of the split image 91, a method of updating the split image 91 may be selected taking a network state into account.

Figure 12:
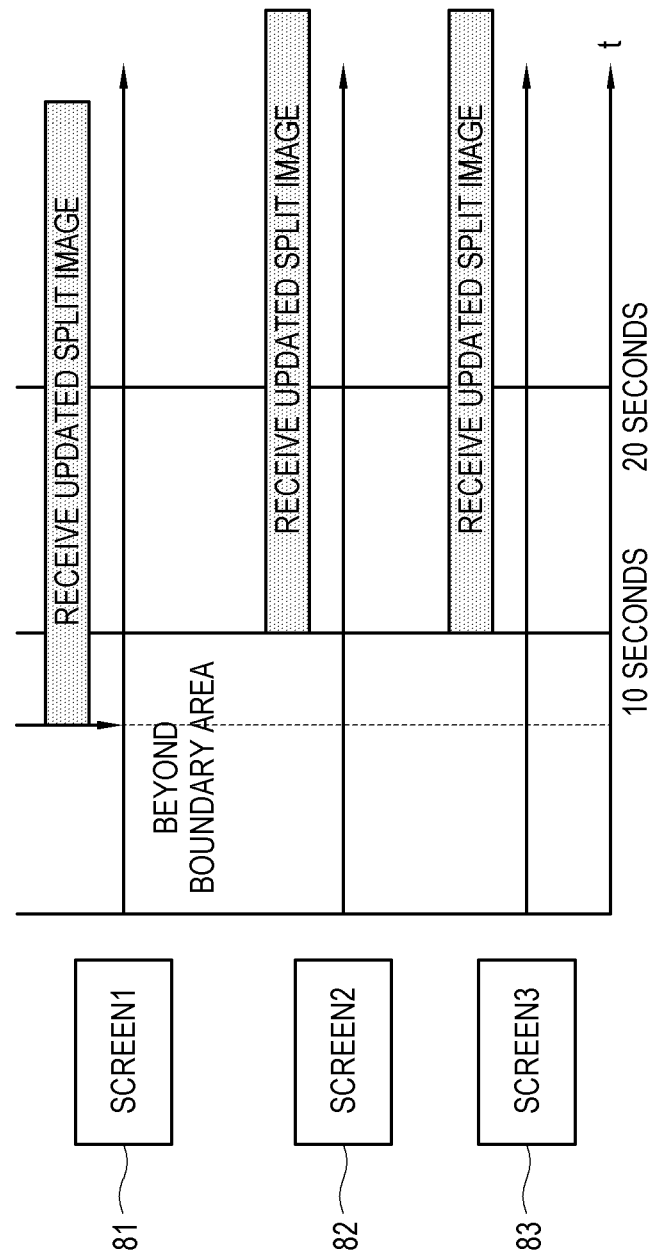
FIG. 12 illustrates an example of a point in time of updating a split image according to an embodiment of the disclosure.

For example, as shown in FIG. 12, when the projection image 811 is displayed beyond the boundary area 102 while the split image 91 of the unit frame is received every 10 seconds in a state that a network is unstable, a request for updating the split image 91 corresponding to the screen 81 may be preferentially transmitted to the server 10.

In this case, the server 10 updates the split image 91 corresponding to change in the viewpoint of the screen 81 in response to the request, and transmits the updated split image 91 to the screen.

In this case, with regard to the other screens 82 and 83, except the screen 81, the split images 92 and 93 updated in the next cycle after a lapse of 10 seconds may be received, or the split images 92 and 93 may be received after the network state is recovered.

Figure 13:
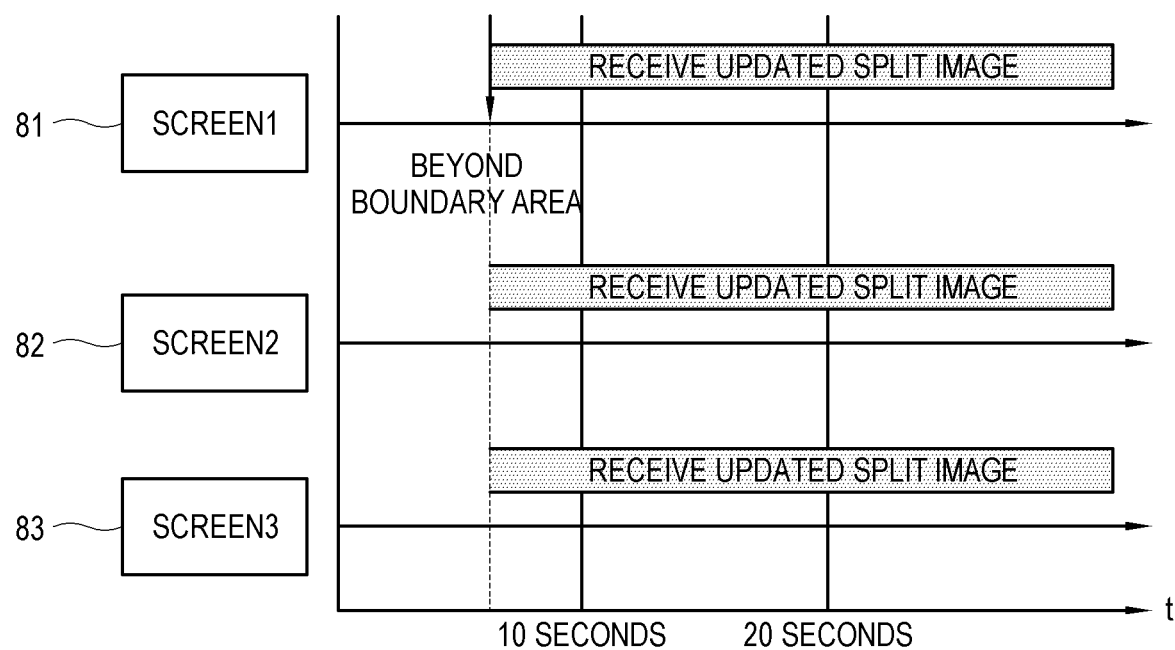
FIG. 13 illustrates an example of a point in time of updating a split image according to an embodiment of the disclosure.

Alternatively, as shown in FIG. 13, when the projection image 811 is displayed beyond the boundary area 102 while the split image 91 of the unit frame is received every 10 seconds in a state that a network is stable, a request for simultaneously updating the split images 91, 92 and 93 corresponding to not only the screen 81 but also the other screens 82 and 83 connected to the screen 81 may be transmitted to the server 10.

In this case, the server 10 updates the plurality of split images 91, 92 and 93 based on change in the viewpoint of the screen 81 in response to the request, and transmit the updated split images 91, 92 and 93 to the screens 81, 82 and 83.

In this case, the updated split images 91, 92 and 93 are simultaneously received before a lapse of 10 seconds with regard to not only the screen 81 of which the projection image 811 is displayed beyond the boundary area 102 of the split image but also the screens 82 and 83.

FIG. 14 illustrates an example of updating a split image corresponding to change in a view angle based on user control according to an embodiment of the disclosure. As shown in FIG. 14, a reduced projection image 181 is displayed on the screen 81 when zoomed in based on user control, and an enlarged projection image 182 is displayed on the screen 81 when zoomed out based on user control.

Therefore, the zoom-in projection image 181 is unlikely to go beyond the boundary area 102 of the split image 91, and the zoom-out projection image 182 is likely to go beyond the boundary area 102 of the split image 91.

Therefore, the split image 91 are adjusted in size according to whether it is zoomed in or out, thereby normally displaying the image on the screen 81.

That is, the server 10 is requested to reduce the split image 91 with regard to the zoomed-in projection image 181, and enlarge the split image 91 with regard to the zoomed-out projection image 182. In such a manner, it is possible to prevent an image from being abnormally displayed on the screen 81 as zoomed in or out.

Figure 16:
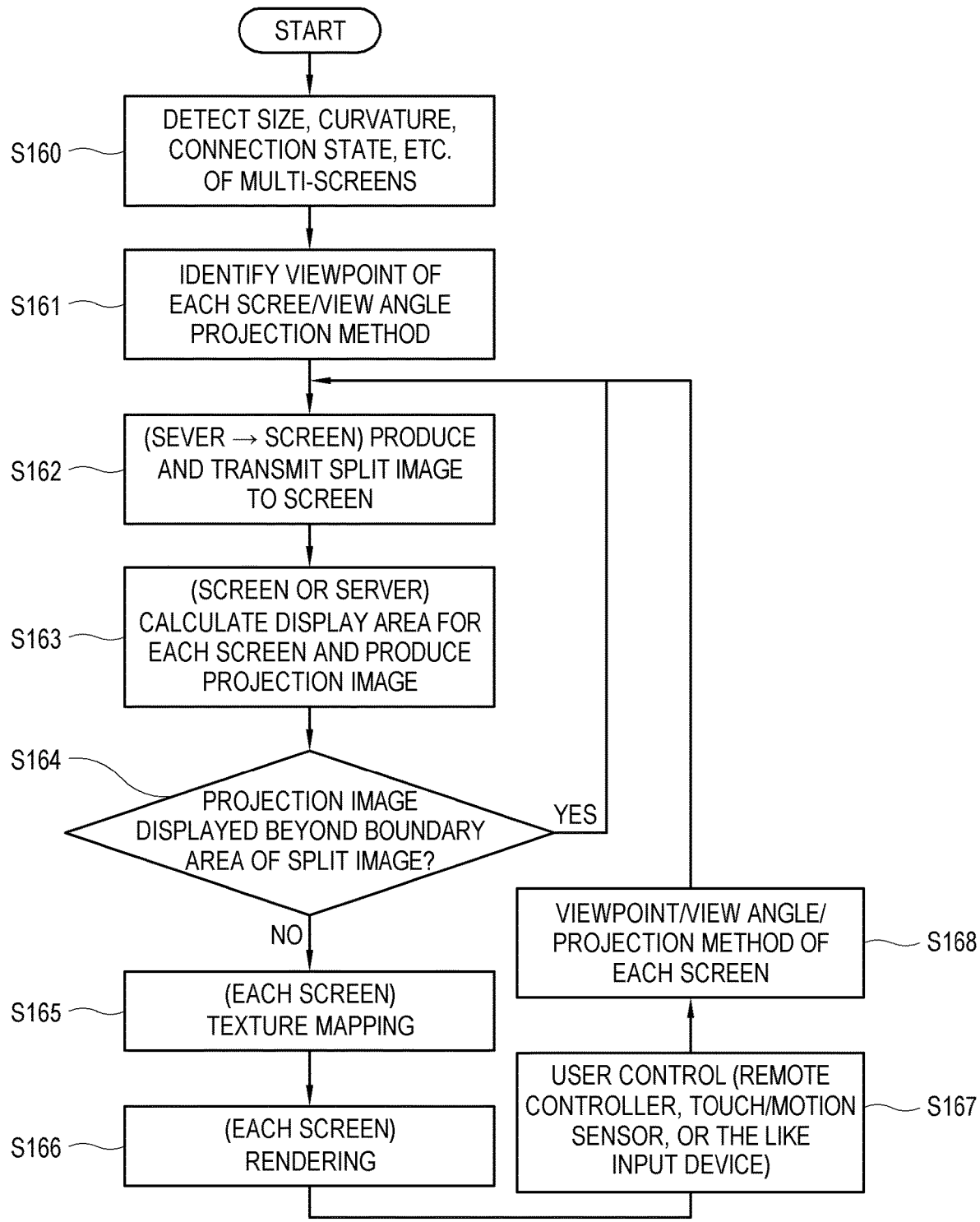
FIG. 16 is a flowchart of operations between a server and multi-screens according to an embodiment of the disclosure.

FIG. 16 is a flowchart of operations between a server and multi-screens according to an embodiment of the disclosure. As shown in FIG. 16, at operation S160, the sizes, curvatures, connection states, etc. of the multi-screens are first detected. At operation S161, the viewpoints, the view angles and the projection method of the screens are identified based on the detection information about the multi-screens.

Next, at operation S162, the server produces and transmits the split images to the screens, based on the identified viewpoints, view angles and projection methods of the screens.

At operation S163, each screen or the server calculates a display area for each screen to produce the projection image.

Next, at operation S164, it is identified whether the projection image is displayed beyond the boundary area of the split image.

As a result of identification in the operation S164, when the projection image is displayed beyond the boundary area of the split image, at operation S162 the server produces the split image corresponding to each screen again and transmit it.

As a result of identification in the operation S164, when the projection image is displayed within the boundary area of the split image, at operation S165 each screen performs texture mapping for the split image with regard to the sphere.

Next, at operation S166, each screen renders and displays the projection image from the mapping result.

When a user input is received through a remote controller, touch and motion sensors, etc. at operation S167, at operation S168 the viewpoint, the view angle, and the projection method of each screen are changed based on the user input. In this case, the server produces the split image corresponding to each screen again and transmits it in the operation S162.

According to an embodiment of the disclosure, the 360-degree image is reproduced on the multi-screens corresponding to change in the viewpoint and the view angle based on the user control. Further, the server is less burdened because the projection and rendering are simultaneously performed in the screens.

Although a few exemplary embodiments have been described in detail, the disclosure is not limited to these embodiments and various changes can be made within the appended claims.

What is claimed is:

1. A server comprising:
a communicator, including communication circuitry, configured to communicate with a plurality of display apparatuses; and
a processor configured to:
identify individual viewpoints of the plurality of display apparatuses,
produce a plurality of split images corresponding to the identified individual viewpoints from a 360-degree image,
control the communicator to transmit the plurality of split images to the plurality of display apparatuses, respectively, so that each display apparatus displays a projection image within a boundary area of the transmitted split image, the boundary area being provided inwardly from a boundary of the transmitted split image by a predetermined width,
in response to information indicating that the projection image is to be beyond the boundary area being received from a first display apparatus among the plurality of display apparatuses, update a viewpoint of the first display apparatus, and
control the communicator to transmit a split image corresponding to the updated viewpoint to the first display apparatus.

2. The server according to claim 1, wherein the processor is configured to control the communicator to transmit the plurality of split images corresponding to updated individual viewpoints to the plurality of display apparatuses, according to an order being determined based on the projection image being displayed beyond the boundary area.

3. The server according to claim 1, wherein the processor is configured to control the communicator to transmit layout information about the 360-degree image to the plurality of display apparatuses, and transmit the plurality of split images based on the transmitted layout information, and
the layout information comprises information about locations and sizes of the plurality of split images.

4. The server according to claim 1, wherein the processor is configured to adjust a resolution of the split image transmitted to the display apparatus based on at least one of the viewpoint, a network state, a transceiving cycle, or a bandwidth of a screen of the display apparatus.

5. A computer program product comprising:
a memory configured to store an instruction; and
a processor,
the instruction being executed by the processor to:
identify individual viewpoints of the plurality of display apparatuses,
produce a plurality of split images corresponding to the identified individual viewpoints from a 360-degree image,
control a communicator including communication circuitry to transmit the plurality of split images to the plurality of display apparatuses, respectively, so that each display apparatus displays a projection image within a boundary area of the transmitted split image, the boundary area being provided inwardly from a boundary of the transmitted split image by a predetermined width,
in response to information indicating that the projection image is to be beyond the boundary area being received from a first display apparatus among the plurality of display apparatuses, update a viewpoint of the first display apparatus, and
control the communicator to transmit a split image corresponding to the updated viewpoint to the first display apparatus.

6. A display apparatus comprising:
an image processor configured to process an image signal;
a display;
a communicator including communication circuitry configured to communicate with a server; and
a processor configured to:
identify a viewpoint of the display apparatus,
control the communicator to transmit to the server information on the identified viewpoint,
receive from the server a split image corresponding to the identified viewpoint, obtained from a 360-degree image,
perform mapping the received split image to a three-dimensional image,
receive a user input to move the viewpoint,
according to the user input, identify an area to produce a projection image within a boundary area of the received split image, the boundary area being provided inwardly from a boundary of the received split image by a predetermined width, and
in response to the identified area to produce the projection image being beyond the boundary area, control the communicator to transmit, to the server, information indicating that the projection image to be displayed is beyond the boundary area such that the server updates viewpoint information of the display apparatus.

7. The display apparatus according to claim 6, wherein the processor is configured to receive a split image corresponding to the updated viewpoint information from the server.

8. The display apparatus according to claim 6, wherein the processor is configured to control the image processor to perform mapping the received split image to a spherical shape based on the viewpoint.

9. The display apparatus according to claim 6, wherein the processor is configured to control the communicator to transmit a request for the split image corresponding to the updated viewpoint information to the server, according to an order being determined based on the projection image to be displayed beyond the boundary area.

10. The display apparatus according to claim 6, wherein the processor is configured to control the communicator to receive layout information about the 360-degree image from the server, and receive the split image based on the received layout information, and the layout information comprises information about a location and a size of the received split image.

11. A computer program product comprising:
a memory configured to store an instruction; and
a processor,
the instruction being executed by the processor to:
- identify a viewpoint of the display apparatus,
- control a communicator including communication circuitry to transmit to a server information on the identified viewpoint,
- receive from the server a split image corresponding to the identified viewpoint, obtained from a 360-degree image,
- perform mapping the received split image to a three-dimensional image,
- receive a user input to move the viewpoint,
- according to the user input, identify an area to produce a projection image within a boundary area of the received split image, the boundary area being provided inwardly from a boundary of the received split image by a predetermined width, and
- in response to the identified area to produce the projection image being beyond the boundary area,
control the communicator to transmit, to the server, information indicating that the projection image to be displayed is beyond the boundary area such that the server updates viewpoint information of the display apparatus.

* * * * *